US012715091B2

(12) United States Patent
Ballard

(10) Patent No.: US 12,715,091 B2
(45) Date of Patent: Aug. 25, 2026

(54) TUBE COUPLING APPARATUS

(71) Applicant: PARKER HANNIFIN EMEA S.À.R.L, Etoy (CH)

(72) Inventor: Kevin Ballard, Lynton (GB)

(73) Assignee: PARKER HANNIFIN EMEA S.À.R.L, Etoy (CH)

(*) Notice: Subject to any disclaimer, the term of this patent is extended or adjusted under 35 U.S.C. 154(b) by 843 days.

(21) Appl. No.: 17/796,743

(22) PCT Filed: Feb. 8, 2021

(86) PCT No.: PCT/EP2021/052962
§ 371 (c)(1),
(2) Date: Aug. 1, 2022

(87) PCT Pub. No.: WO2021/156506
PCT Pub. Date: Aug. 12, 2021

(65) Prior Publication Data

US 2023/0070756 A1 Mar. 9, 2023

(30) Foreign Application Priority Data

Feb. 7, 2020 (GB) ..................................... 2001715

(51) Int. Cl.
*B25B 27/10* (2006.01)
*B21D 39/04* (2006.01)
(Continued)

(52) U.S. Cl.
CPC ............ *B25B 27/10* (2013.01); *B21D 39/046* (2013.01); *B23P 19/027* (2013.01); *B23P 19/061* (2013.01);
(Continued)

(58) Field of Classification Search
CPC .... B25B 27/10; B21D 39/046; B21D 39/048; B23P 19/027
See application file for complete search history.

(56) References Cited

U.S. PATENT DOCUMENTS 4,189,817 A * 2/1980 Moebius ................ B25B 27/16 29/237
5,353,623 A * 10/1994 Bobenhausen ...... B21D 39/048 72/402
(Continued)

FOREIGN PATENT DOCUMENTS

CH 710715 A2 * 8/2016 ............ B25B 27/10
CN 110277714 A * 9/2019
(Continued)

OTHER PUBLICATIONS

International Search Report and Written Opinion of the International Searching Authority for corresponding International Patent Application No. PCT/EP2021/052962, dated Apr. 28, 2021.

*Primary Examiner* — Jermie E Cozart
(74) *Attorney, Agent, or Firm* — Renner, Otto, Boisselle & Sklar, LLP

(57) ABSTRACT

A tube coupling apparatus includes first and second clamping jaws that are mounted on a tool body. The clamping jaws are movable relative to each other between an open configuration in which they are receive a compressible tube connector, and a closed configuration in which they apply a compression force to compress the compressible tube coupling about one or more tube members. An actuator is arranged to move at least one of the clamping jaws to the closed configuration and a controller is operative to control the actuator. A sensor is provided that is arranged to determine a system parameter indicative of the compression force applied to the coupling by the clamping jaws and to progressively increase the compression force of the clamping
(Continued)

jaws during a fitting operation. The controller monitors the system parameter data from the sensor and automatically controls the actuator to prevent the compression force exceeding a predetermined threshold based on the sensor data.

18 Claims, 4 Drawing Sheets

(51) Int. Cl.
*B23P 19/027* (2006.01)
*B23P 19/06* (2006.01)
*B25B 5/06* (2006.01)
*B25B 5/14* (2006.01)

(52) U.S. Cl.
CPC .............. *B25B 5/061* (2013.01); *B25B 5/147* (2013.01); *B21D 39/048* (2013.01)

(56) References Cited

U.S. PATENT DOCUMENTS

| | | | | |
|---|---|---|---|---|
| 5,414,632 | A * | 5/1995 | Mochizuki | G05B 19/406 700/177 |
| 5,694,670 | A * | 12/1997 | Hosseinian | B21D 39/04 29/237 |
| 9,604,273 | B1 * | 3/2017 | Hogan | B21D 39/046 |
| 2003/0066324 | A1 * | 4/2003 | Goop | B21D 39/04 72/3 |
| 2004/0122619 | A1 * | 6/2004 | Malone | B21D 39/046 702/182 |
| 2005/0081359 | A1 * | 4/2005 | Palejwala | B25B 27/10 29/516 |
| 2005/0241359 | A1 * | 11/2005 | Viegener | B21D 39/046 72/416 |
| 2007/0028660 | A1 * | 2/2007 | Intagliata | B21D 39/048 72/402 |
| 2009/0260216 | A1 * | 10/2009 | Avnon | B25B 27/10 29/237 |
| 2011/0302762 | A1 * | 12/2011 | Williams | F16L 19/045 29/428 |
| 2015/0360278 | A1 * | 12/2015 | Kajitani | B21D 41/02 72/312 |
| 2016/0023419 | A1 | 1/2016 | Frenken | |
| 2016/0325337 | A1 * | 11/2016 | Suresh | F16L 13/146 |
| 2016/0346890 | A1 * | 12/2016 | Dunkin | B23Q 17/0966 |
| 2016/0363510 | A1 | 12/2016 | Kanack et al. | |
| 2018/0126526 | A1 * | 5/2018 | Gallegos | B25B 27/10 |
| 2019/0217357 | A1 | 7/2019 | Ruch et al. | |
| 2019/0232481 | A1 | 8/2019 | Skinner | |
| 2023/0070756 | A1 * | 3/2023 | Ballard | B25B 5/061 |

FOREIGN PATENT DOCUMENTS

| | | | | | |
|---|---|---|---|---|---|
| EP | 0687040 | A2 * | 12/1995 | | |
| EP | 3639941 | A1 * | 4/2020 | B21D 39/046 |
| EP | 3671385 | A1 * | 6/2020 | G05B 19/4183 |
| GB | 2423561 | A | 8/2006 | |
| GB | 2505946 | A | 3/2014 | |
| IT | MI20121106 | A1 | 12/2013 | |
| WO | WO-9520463 | A1 * | 8/1995 | B25B 27/16 |
| WO | WO-2012021833 | A1 * | 2/2012 | F16L 5/00 |

* cited by examiner

| Metric Tube Material | Tube O.D. | Metric Tubing Wall Thickness | | | | | |
|---|---|---|---|---|---|---|---|
| | | 1 | 1.2 | 1.5 | 1.8 | 2 | 2.2 |
| Stainless Steel 316 (ASTM A269) | 6mm | OPTION A (400 bar) | OPTION A (400 bar) | OPTION A (400 bar) | OPTION A (400 bar) | OPTION A (400 bar) | |
| | 10mm | OPTION A (400 bar) | OPTION A (400 bar) | OPTION A (400 bar) | OPTION A (400 bar) | OPTION B (690 bar) | OPTION B (690 bar) |
| INCOLOY® Alloy 825 (ASTM B423) | 6mm | OPTION A (400 bar) | OPTION A (400 bar) | OPTION A (400 bar) | OPTION A (400 bar) | OPTION A (400 bar) | |
| | 10mm | OPTION A (400 bar) | OPTION A (400 bar) | OPTION A (400 bar) | OPTION B (690 bar) | OPTION B (690 bar) | |
| INCONEL® Alloy 625 (ASTM B444-06) | 6mm | OPTION A (400 bar) | OPTION B (690 bar) | OPTION B (690 bar) | | | |
| | 10mm | OPTION B (690 bar) | OPTION B (690 bar) | OPTION B (690 bar) | OPTION B (690 bar) | OPTION B (690 bar) | |

Fig. 4

TUBE COUPLING APPARATUS

This application is a national phase of International Application No. PCT/EP2021/052962 filed Feb. 8, 2021, which claims priority to United Kingdom Application No. 2001715.8 filed Feb. 7, 2020, each of which is hereby incorporated herein by reference in its entirety.

FIELD OF INVENTION

The present invention relates to a tube coupling apparatus, and in particular an apparatus for the in-situ fitting of a compressible tube coupling for coupling tubes, pipes or the like that includes means for preventing over compression of the coupling.

BACKGROUND

Compression fittings are commonly used in the instrumentation tube fittings industry as well as in shipbuilding, aerospace, automotive, and construction to connect two tubes or pipes together and provide a seal against leakage, particularly for high pressure applications. Compression fittings generally comprise a tube fitting, a compression fitting and an inner member that is typically a compression ring or ferrule. The compression fitting is used to apply a compressive force to the ferrule to clamp the inner member, or ferrule, around the tube and to compress it against the tube fitting. As the ferrule is compressed between the compression fitting and the tube fitting the ferrule seals the space between the tube, the compression fitting and the tube fitting, thereby forming a sealed joint.

UK patent numbers GB2423561 and GB2505946 describe tube couplings comprising a tube fitting body having an end portion, or ferrule, with an interior bore having a plurality of annular protuberances defining teeth extending into the bore, and a collar. The collar is provided around the inner body and the inner body and the collar each have corresponding tapered conical surfaces inclined to their axes. A tube is located within the bore of the inner member, and the collar and the tube fitting are longitudinally forced together. As the tube fitting body and collar are forced together the collar is urged over the inner member. The inclined surfaces cooperate such that as the collar is linearly forced against the inner member it applies a circumferential compressive force to the inner member that acts to deform the inner member radially inwards. As the inner member is deformed teeth engage the tube and bite into its surface creating a seal with tube. The collar is retained in engagement with the tube fitting body to an in engagement with the ferrule to maintain the seal.

It is known to use clamping jaws operated by a hydraulic ram to force such fittings together. Known clamping tools include a hand held tool including a pair of clamping jaws and a ram, which is connected via hydraulic lines to a pump to provide the required fluid pressure to operate the jaws. During fitting the operator must determine when the fitting of the coupling has been completed and ensure that the coupling is not over compressed due to over pressurisation of the hydraulic actuator. The pressure required to fully assemble a coupling configuration varies depending on factors such as the fitting type, and the material, size, and wall thickness of the tubing. Exceeding the maximum pressure for a given coupling may result in failure of the seal and could create a leak pathway that may lead to failure of the coupling during use.

It is therefore desirable to provide an improved tube coupling apparatus which addresses the above described problems and/or which offers improvements generally.

SUMMARY

According to the present invention there is provided a tube coupling apparatus as described in the accompanying claims.

In an aspect of the invention there is provided a tube coupling apparatus for the fitting of compressible tube couplings. The apparatus comprises a tool body; first and second clamping jaws mounted on the tool body that are movable relative to each other between an open configuration in which they are configured and arranged to receive a compressible tube connector, and a closed configuration in which the clamping jaws apply a compression force to compress the compressible tube coupling about one or more tube members; an actuator arranged to move at least one of the clamping jaws to the closed configuration; a controller 90 (hereinafter "controller") configured to control the actuator; and a sensor 92 (FIG. 2) (hereinafter "sensor") arranged to determine a system parameter indicative of the compression force applied to the coupling by the clamping jaws. The actuator is configured to progressively increase the compression force of the clamping jaws during a fitting operation and the controller is configured to receive sensor data from the sensor relating to the system parameter determined by the sensor and to automatically control the actuator to prevent the compression force exceeding a predetermined threshold based on the sensor data. The predetermined threshold may be a maximum compression force above which the coupling may be damaged, or the compression force required to complete the fitting of the coupling. The tube coupling apparatus is therefore able to automatically determine when complete fitting of the coupling is achieved, and to prevent over compression of the of the coupling by stopping the actuator when fitting is completed or when the maximum compression force is reached.

The actuator may be a hydraulic actuator, and the sensor may be a pressure sensor arranged to determine the hydraulic pressure of the actuator. The hydraulic actuator is preferably a hydraulic cylinder and the pressure sensor is preferably a pressure transducer.

The predetermined threshold is preferably a predetermined hydraulic pressure. The predetermined hydraulic pressure is preferably a pressure greater than or equal to the hydraulic pressure required to complete assembly of the tube coupling and less than the maximum fitting pressure of the coupling at which damage to the coupling may occur. As such, the controller ensures that the fitting of the coupling is fully completed while preventing the pressure reaching a level that may cause damage to the coupling.

The coupling identifier data is preferably indicative of the predetermined threshold A range of tube coupling configurations are preferably grouped based on their maximum fitting pressure and a predetermined threshold pressure is associated with each group. The user input data is indicative of the group to which the tube coupling configuration to be fitted is associated, and the controller determines the predetermined threshold associated with that group and hence the predetermined threshold for the tube coupling configuration based on the user input.

The controller may be operative to acquire the data relating to the predetermined threshold from a data source.

The controller is preferably operative to acquire threshold data from a data source relating to the predetermined threshold and to compare the threshold data with the sensor data to determine when the predetermined threshold is reached. The data source may be a database or other data source stored on a local data storage device such as a hard drive located on or connected to the tube coupling tool. Alternatively, the data source may be remote storage, such as cloud storage, and the controller may comprise means for remote communication with the data source, such as wireless communication.

The controller is preferably operative to receive coupling identifier data relating to the tube coupling to be fitted and to determine the predetermined threshold corresponding for the coupling to be fitted from the threshold data based on the coupling identifier data.

The coupling identifier data is preferably user input data. The coupling identifier may identify the coupling itself and the specific coupling configuration including the information relating to the tubes being coupled. The term coupling configuration herein may mean the type of coupling, the size of the coupling, the tube material, the tube size, and/or the tube wall thickness. The coupling identifier may for example be a coupling serial number or part number. The identifier data may be input by the user using a control display located on or operatively connected to the tool.

The actuator is preferably a hydraulic actuator, the sensor is a pressure sensor arranged to determine the hydraulic pressure of the actuator, and the predetermined threshold is a hydraulic pressure of the actuator required to complete fitting of the coupling. Herein reference to the hydraulic pressure of the actuator means the system pressure, which is the pressure of the hydraulic pressure supplied to the actuator and the pressure within the actuator cylinder.

The tube coupling apparatus preferably further comprises a pump for supplying pressurised hydraulic fluid to the actuator. The controller is operative to control the pump when the predetermined threshold is reached to prevent the hydraulic pressure of the actuator exceeding the predetermined threshold, which may comprise stopping the pump.

The clamping jaws preferably comprise a first clamping jaw that is fixed relative to the tool body and a second clamping jaw that is movable relative to the tool body between the open and closed configurations, and the hydraulic actuator engages the second clamping jaw to move the second clamping jaw to the closed configuration.

An fitting cycle of the tube coupling tool may be considered to be completed when the predetermined threshold is reached during fitting of the coupling, and the controller is operative to count the number of fitting cycles, which may be logged by the controller.

The controller is preferably operative to determine when the number of counted fitting cycles reaches one or more predetermined cycle thresholds for the tube coupling apparatus and to execute an operation when said one or more cycle thresholds is reached.

The controller is preferably operative to disable the tube coupling apparatus when one or more predetermined cycle thresholds is reached. The term 'disable' herein means any action which prevents normal use of the tool by the user and may mean permanently disable or temporarily disable.

The one or more predetermined thresholds for the tube coupling apparatus preferably include a maximum value indicative of the maximum lifecycle of the tube coupling. The controller may be operative to permanently disable the tube coupling apparatus when the maximum lifecycle threshold is reached.

The one or more predetermined thresholds for the tube coupling apparatus preferably include a cycle threshold defining a service interval and the controller is operative to provide a user determinable indication when the service interval has been reached. The controller is therefore advantageously able to alert the user when service or maintenance of the tube coupling apparatus is required.

The tube coupling apparatus preferably comprises a visual user display 94 (FIG. 2) (hereinafter "visual user display") and the controller is operative to generate an indication on the visual user display indicating that the one or more predetermined thresholds has been reached.

The actuator is preferably a hydraulic actuator, the sensor is a pressure sensor arranged to determine the hydraulic pressure of the actuator, and the controller is operative to determine the rate of increase of hydraulic pressure during operation of the tube coupling apparatus based on data received from the sensor and to stop the actuator if the rate of increase of hydraulic pressure exceeds a threshold outside the normal range of operation indicative of a pressure spike. This may be determined with reference to a maximum value indicative of a pressure spike and/or with reference to an expected pressure/time trace.

In another aspect of the invention there is provided a tube coupling apparatus for the fitting of compressible tube couplings; the apparatus comprising a tool body; first and second clamping jaws mounted on the tool body that are movable relative to each other between an open configuration in which they are configured and arranged to receive a compressible tube connector, and a closed configuration in which the clamping jaws apply a compression force to compress the compressible tube coupling about one or more tube members; an actuator arranged to move at least one of the clamping jaws to the closed configuration; a controller configured to control the actuator; and a sensor arranged to determine a system parameter indicative of the compression force applied to the coupling by the clamping jaws. The actuator is configured to progressively increase the compression force of the clamping jaws during a fitting operation and an fitting cycle of the tube coupling tool is completed when the compression force reaches a predetermined threshold, and the controller is configured to determine the compression force based on sensor data received from the sensor, count an fitting cycle each time the predetermined threshold is reached, determine when the number of counted fitting cycles reaches one or more predetermined cycle thresholds, and execute an operation when said one or more cycle thresholds is reached.

The controller is preferably operative to disable the tube coupling apparatus when one or more predetermined cycle thresholds is reached.

Preferably the one or more predetermined thresholds for the tube coupling apparatus includes a maximum value indicative of the maximum lifecycle of the tube coupling.

The one or more predetermined thresholds for the tube coupling apparatus preferably defines a service interval and the controller is operative to provide a user determinable indication when the service interval has been reached.

The tube coupling apparatus preferably comprises a visual user display and the controller is operative to generate an indication on the visual user display indicating that the one or more predetermined thresholds has been reached.

In another aspect of the invention there is provided a tube coupling apparatus for the fitting of compressible tube couplings; the apparatus comprising a tool body; first and second clamping jaws mounted on the tool body that are movable relative to each other between an open configuration in which they are configured and arranged to receive a compressible tube connector, and a closed configuration in which the clamping jaws apply a compression force to compress the compressible tube coupling about one or more tube members; a hydraulic actuator arranged to move at least one of the clamping jaws to the closed configuration; a controller configured to control the hydraulic actuator; and a pressure sensor arranged to determine the hydraulic pressure of the hydraulic actuator. The hydraulic actuator is configured to progressively increase the compression force of the clamping jaws during a fitting operation and the controller is operative to determine the rate of increase of hydraulic pressure during operation of the tube coupling apparatus based on data received from the pressure sensor and to stop the actuator if the rate of increase of hydraulic pressure exceeds a predetermined threshold. The predetermined threshold may be selected to be indicative of completed assembly of the fitting. Alternatively or in addition the predetermined threshold may be a value outside the normal range of operation indicative of a pressure spike resulting from a system failure.

BRIEF DESCRIPTION OF THE DRAWINGS

The present invention will now be described by way of example only with reference to the following illustrative figures in which:

FIG. 4 is an example table of tube coupling configurations grouped according to their pressure thresholds.

DESCRIPTION OF EMBODIMENTS

Figure 1:
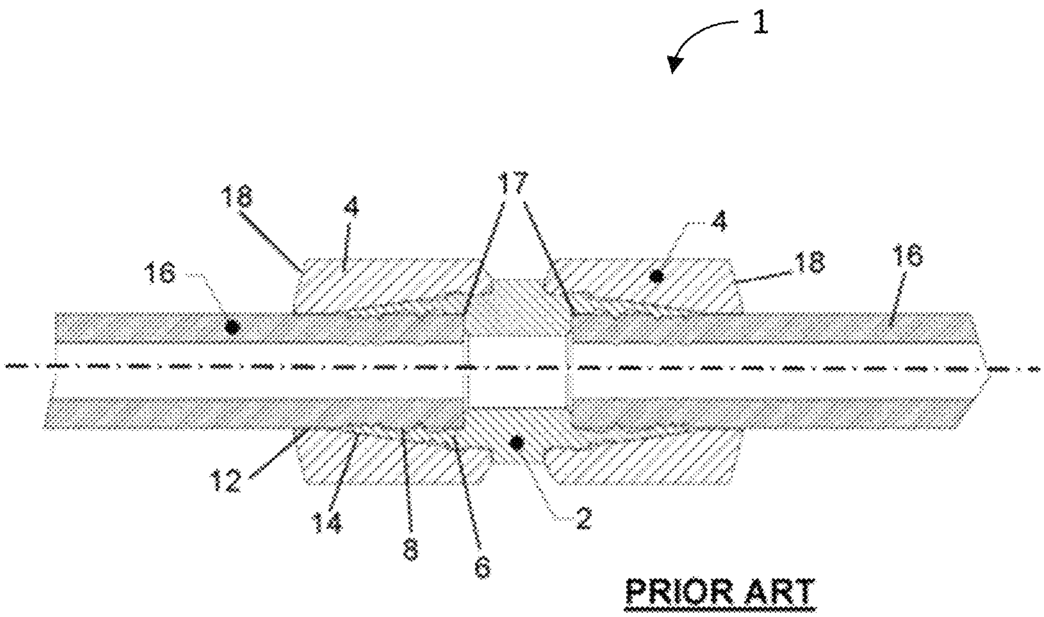
FIG. 1 shows a known tube connector.

Referring to FIG. 1 a coupling 1 of the prior art comprises a body 2 and a pair of collars 4. The body 2 has an integral frusto-conical end sections 6 at opposing ends which taper to the distal ends. The conical end sections 6 each have an inner bore 8 having a number of circumferentially extending interior annular protuberances or teeth 10.

Each collar 4 includes an inner bore 12 and part of the collar 4 is configured fit around the body 2 in an interference fit to hold the collar 4 on the body 2. The bore 14 of each collar 4 includes an internal frusto-conical profile 14 that corresponds to the outer frusto-conical profile of the end section 6.

In use two tubes 16 to be connected are inserted through the bores 12 of the collars 4. The tubes 16 are then inserted through the bores 8 of the respective end sections 6 until they have at least passed the last tooth 10 and preferably until they abut the abutment faces 17 at ends of the bores 8 defining which define a stop.

Once the tubes 16 are located, the collars 4 are forced in opposing direction towards each other onto the respective end sections 6. To achieve this opposing linear forces are required to force the collars 4 towards each other and compress them onto the body section 2. The collars 4 each include an annular end face 18 oriented substantially perpendicular to the longitudinal axis which define abutment surfaces to which the linear forces may be applied.

As the collars 4 are forced over the external frusto-conical surfaces of the end sections 6, the external frusto-conical surfaces 6 engage with the internal frusto-conical surfaces 12 of the collars 4 causing compression of the end sections 6. Internally during compression, tube grip occurs as the teeth 10 make contact with the tubes 16. The teeth 10 cut into the outer skin of the tubes 16 until a point where the force required to cut into the skin becomes larger than the force required to deform the tubes 16. At this point the tubes 16 will begin to deform resulting in the tubes 16 swelling in some areas and in some areas contracting. This deformation combined with the initial tube bite produces a high quality seal the tubes 16 and the teeth 10 of the end sections 16, as well as resulting in a form that cannot be removed from the end sections 6.

Figure 2:
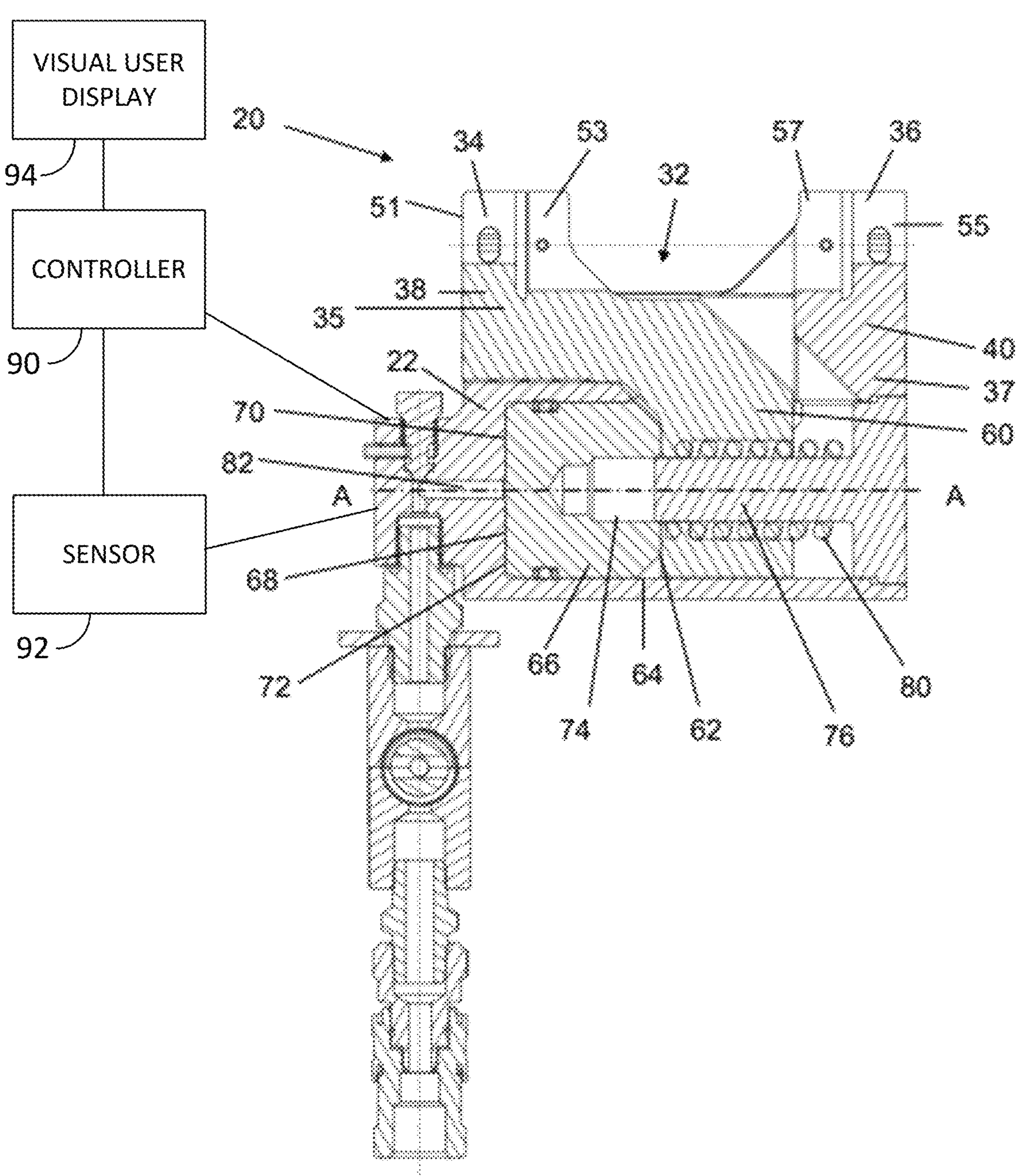
FIG. 2 shows a tube connector apparatus according to an embodiment of the present invention.

An apparatus for compressing the tube coupling 1 is now described in accordance with an embodiment of the invention. In FIG. 2 a tube coupling tool 20 is shown comprising a body 22 that may be provided within an outer housing casing. The apparatus may be hand-held, in which case the body 22 is of a suitable size and weight that the tube coupling tool 20 may be held and supported by a single user gripping one or more handles provided on the tube coupling tool 22. Alternatively, the apparatus may be configured to be received and held on a suitable support or support surface in use, particularly where the apparatus is configured for use in coupling larger tubes.

The body 22 includes a longitudinal axis A-A. A set of clamping jaws 32 is mounted to the body 22. The clamping jaws 32 include a movable clamping jaw 34 and a fixed clamping jaw 36. The movable clamping jaw 34 and fixed clamping jaw 36 include a movable clamping head 38 and fixed clamping head 40 extending from a movable clamping jaw body 35 and fixed clamping jaw body 37 respectively. The movable clamping head 38 and fixed clamping head 40 project vertically from the movable clamping jaw body 35 and fixed clamping jaw body 37 in a direction substantially perpendicular to the longitudinal axis A-A of the body 22.

Figure 3:
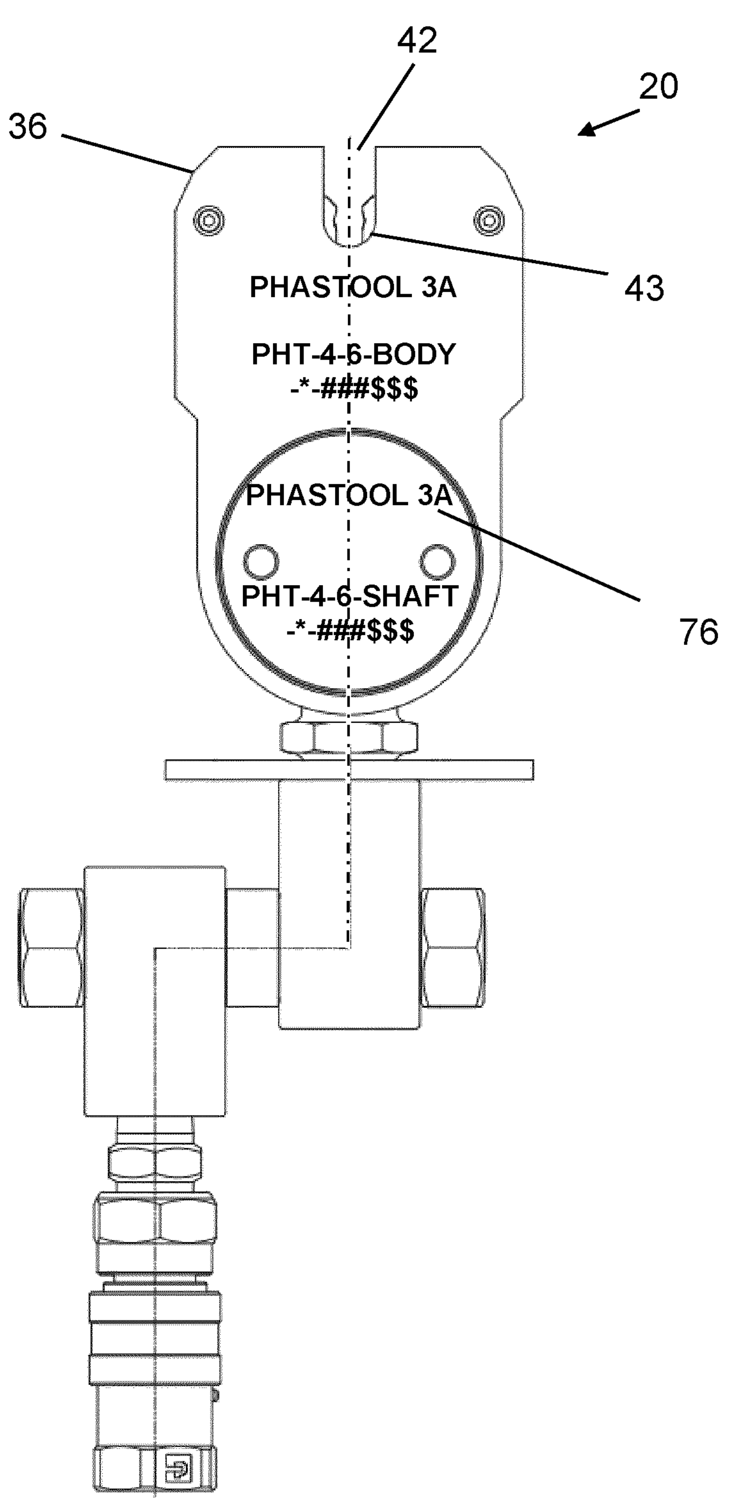
FIG. 3 is an end view of the tube connector of FIG. 2.

Referring to FIG. 3, the fixed and movable clamping heads 38 and 40 each includes a channel 42 open at the upper face of the fixed and movable clamping heads 38 and 40 and extending downwardly from the upper face in a direction perpendicular to the longitudinal axis A-A of the body 22. Each channel 42 has a radiused, substantially semi-circular profile at its base 43 such that the channel is substantially u-shaped. Each channel 42 is configured to receive a cylindrical tube through the opening of the channel 42, with the tubes able to pass longitudinally downwards through the perpendicular to the longitudinal axis A-A of the body 22 and seat at the base 43. The movable clamping head 38 has a longitudinally outer face 51 and a longitudinally inner face 53. The fixed clamping head 40 has a longitudinally outer face 55 and a longitudinally inner face 57. The inner faces 53,57 of the fixed and movable clamping heads 38 and 40 each include a recess having a profile corresponding to the end profile of the tube collars 4 of the tube coupling 1. The recesses may be integrally formed on the inner faces of clamping heads 38 and 40. Alternatively and more preferably the clamping heads 38 and 40 include removable inserts that define the inner surface of the clamping heads 38 and 40 when located in use. The clamping head inserts are able to be removed and replaced with one of a range of inserts having recesses configured for a corresponding range of fittings. The channels 42 have a width corresponding to the diameter of the tubes to joined, and the recess in each inner face 53,57 is greater than the width of each channel 42 and is configured to receive and seat the end face of a coupling collar 4.

The fixed clamping jaw 36 includes a longitudinally extending guide channel formed in the fixed clamping jaw body 37. The fixed clamping jaw 36 may be integrally formed as part of the body 22 with the body 22 and fixed clamping jaw 36 for example being machined from a single piece of material. Alternatively, the fixed clamping jaw 36 may be a separate component that is secured to the body 22 by screws or other semi-permanent fixing. The movable clamping jaw body 35 is slidingly received within the guide channel of the fixed clamping jaw body 37 and able to slide longitudinally therein. The movable clamping jaw body 35 includes a pair of transversely opposed guide slots along its side walls that receive corresponding guide rails projecting from the inner walls of the guide channel of the fixed clamping jaw body 37, along which the movable clamping jaw 34 slides relative to the fixed clamping jaw 36.

Referring again to FIG. 2, the movable clamping jaw body 35 includes an engagement section 60 that extends downwardly away from the movable clamping head 38 perpendicular to the longitudinal axis A-A of the body 22, which corresponds to the direction of travel of the movable clamping jaw 34. The engagement section 60 includes a first bore 62 extending longitudinally therethrough. A second bore is formed in the body 22 that defines a piston chamber 64. A piston 66 is movably located within the piston chamber 64. Forming the piston chamber 64 within the body of the fixed clamping jaw in this way, and providing a piston therein, enables the size, weight and cost of the tool to be minimised. The piston 66 has an inner piston face 68 with a diameter equal to the bore diameter of the piston cylinder 64. A piston pressure chamber 70 is defined between the inner piston face 68 and a closed end 72 of the piston chamber 64. The piston 66 includes a central, non-continuous bore 74 open at the distal, non-process end within which is received a guide shaft 76 for guiding travel of the piston 66 and aligning the piston 66 with the engagement section 60 the movable jaw 32. The guide shaft 76 extends through the bore 62 of the engagement section 60 and is received in one end in the central bore 74. A compression spring 80 is provided around the guide shaft 76 of the opposing side of the engagement section.

An inlet port 82 is formed in the body 22 that connects the pressure chamber 70 with a pump for providing pressurised hydraulic fluid to the pressure chamber 70 via a high pressure line. To actuate the clamping jaws high pressure fluid is provided to pressure chamber 72 via the inlet port 82. The pressurised fluid increases the pressure within the pressure chamber 72, which applies a thrust force to the inner piston face 68. As the pressure rises the piston 66 is caused to move longitudinally within the piston chamber 70 in the direction of the fixed jaw 36. The proximal end of the piston 66 defines an abutment surface that engages the engagement section 60. As the piston 66 begins to move it is urged against the engagement section 60 causing the moving jaw 34 to begin to move longitudinally towards the fixed jaw 36, thereby causing the clamping jaw 32 to begin to close. As the moving jaw 34 continues to be moved towards the fixed jaw 36 by the piston 66 the distal end of the guide shaft 76 is further received within the bore 74 of the piston 66. The engagement section 60 compresses the compression spring 80 which applies a returning force against the action of the piston 66. Following compression of the fitting 1 the pressurised fluid is allowed to flow out of the pressure chamber 70 and return to tank. As this happens the pressure reduces and the returning force of the spring 80 then moves the moving jaw 34 in in the reverse direction causing the clamping jaws 32 to return to the open configuration.

In use, a tube coupling is assembled with the collars 4 inserted over the two tubes 16 to be connected. The ends of the two tubes 16 are inserted into the bores 8 of the respective end sections 6 of the coupling 1 until they abut the inner abutment faces 17 at ends of the bores 8. The clamping jaws 32 of the assembly tool 20 are initially held in a fully separated open condition. The apparatus 20 is located about the tube connection such that a first tube 16 is received with the channel of the moving jaw 34 and a second tube 16 is located within the channel of the fixed jaw 36 and the coupling 1 is located between the clamping jaws 32. Prior to operation the hydraulic fluid pressure in the pressure chamber 70 is substantially zero. The coupling tool 20 is operated to secure the coupling 1 to the tubes when the tubes 16 and coupling 1 to be joined are located correctly within the clamping jaws 32.

The fitting cycle of the coupling tool 20 is commenced by operating the pump to pressurise the tool 20. Fluid from the pump flows into the pressure chamber 70. As the pressure in the piston chamber 70 rises and the clamping jaws 32 begin to close. Initially the clamping jaws 32 are substantially freely movable and the pressure required to move the clamping jaws 32 is low. The clamping jaws 32 continue to close until they come into contact with the collars 4 of the coupling 1. As the clamping jaws 32 continue to close the collars 4 are forced over the frusto-conical end sections 6 causing deformation and radial compression with the teeth 10 biting into the tubes 16. At this stage the clamping jaws 32 are no longer substantially freely movable and the force required to continue to close the clamping jaws 32 against the resistance of the coupling 1 substantially increases thereby requiring a significantly elevated piston pressure.

Pressurisation of the pressure chamber 70 continues to increase until sufficient force is generated, and sufficient stroke length is achieved to fully close and complete assembly of the coupling 1. It has been determined by the applicant through repeated testing that for a given coupling assembly, it is possible to determine a pressure characteristic indicative of complete assembly. The pressure characteristic may be a threshold assembly pressure that must be achieved to complete assembly of the coupling. Alternatively, or in addition, the pressure characteristic may be a rapid increase in pressure over time that indicates that face to face contact has been achieved and the collar is no longer moving over the inner body.

Coupling tools of the prior art are manually operated by a user, requiring the user to operate a trigger switch to begin pressurisation, and to release the trigger switch to stop pressurisation once the coupling is fully assembled. This process is reliant on the user manually assessing whether full assembly has been completed and releasing the trigger switch at the appropriate time. Consequently, the threshold pressure required for complete assembly is commonly exceeded due to the lag between complete assembly occurring and user recognition of complete assembly, and between user recognition and the user releasing the trigger switch. If there is excessive lag it is possible that the user may allow the pressure to exceed the maximum pressure for the fitting configuration above which the body of the coupling will begin to plastically deform in a manner that is not designed for, which may cause failure of the seal and result in the creation of a leak pathway. This may result in the failure of the coupling during use such as bursting of the coupling, particularly where the coupling experiences high pressures in use.

A pressure control system is therefore provided that includes a pressure transducer arranged to determine the hydraulic oil supply pressure to the pressure chamber 70. The pressure transducer may be located along the supply line between the pump and the pressure chamber 70. Benchmark data is obtained relating to the measured pressure over time during assembly of a range of fitting configurations. For each fitting configuration, an assembly pressure is determined at which full assembly is completed. The benchmark data may include a series of pressure traces obtained during the assembly of thousands of individual fitting operation cycles during which a pressure transducer communicates with computer software configured to produce a pressure/time plot for each operation cycle. The benchmark data is used to generate a database of threshold assembly pressures and/or maximum pressure, logging the threshold pressure required to complete assembly and/or the maximum pressure for a range of fittings configurations comprising varying coupling sizes, coupling types, tube materials, and tube wall thicknesses.

The pressure control system includes a controller 90 configured to control the piston 66. The pressure control system may be operative to acquire the benchmark data from a data source. The data source may be a local data storage device located on or connected to the tube coupling tool 20. Alternatively, the data source may be remote storage, such as cloud storage, and the controller may comprise means for remote communication with the data source, such as wireless communication. The coupling tool 20 comprises a user interface that enables the user to input instructions to the controller relating to the fitting configuration. The user interface may comprise one or more buttons or keys, an electronic touch screen, or any other suitable input means.

The user input may be an identifier of one or more parameters relating to the fitting configuration. For example, the user may provide an input identifying the type of coupling, the size of the coupling, the tube material, the tube size, and/or the tube wall thickness. Alternatively, the user may provide an input relating to the maximum pressure of the fitting configuration.

In one embodiment the user interface may display information relating to the range of available fitting configurations, which may be presented in the form of a menu, lists, or other information presentation. The user searches the information presented on the user display and selects an option relating to the fitting configuration. The controller is configured to determine a fitting parameter based on the fitting configuration identified or selected by the user. The controller may be configured to compare the fitting configuration data identified from the user input with the benchmark data and identify the maximum fitting pressure corresponding to the fitting configuration.

In another embodiment, the user may provide an input relating to a predetermined pressure which may be the maximum pressure of the fitting and/or a safety threshold pressure. The safety threshold pressure is a pressure below the maximum pressure for the fitting configuration and greater than or equal to the fitting threshold pressure required to complete assembly. The range of fitting configurations may be grouped into classifications having a common safety threshold pressure. Prior to assembly the user may determine from a table, matrix, spreadsheet or other source of information the classification to which the fitting configuration belongs. FIG. 4 provides an example table classifying a range of fitting configurations as Fitting 'Type A' or Fitting 'Type B'. Based on the tube material, outer diameter and wall thickness the user is able to establish using the table the classification that the fitting configuration falls into. Each classification is associated with a predetermined safety threshold pressure. The user then provides an input to the controller indicative of the classification of the fitting configuration. For example, the user display of the controller may present the user with the option of selecting 'Type A' or 'Type B'. The controller is programmed with the safety threshold pressure for each classification or is able to acquire the safety threshold pressure from a data source.

The controller is configured to receive pressure data from the pressure transducer. During the fitting cycle of the tube coupling tool 20 the pressure transducer provides data on the hydraulic fluid system pressure that is indicative of the piston chamber pressure and which correlates to the force applied to the clamping jaws 32 by the piston 66 and hence the force applied to the coupling 1 by the clamping jaws 32. The controller determines a maximum fitting pressure for the fitting operation based on the user input. The maximum fitting pressure may be the threshold fitting pressure or the safety threshold pressure. The maximum fitting pressure may be determined by the controller as described above. The controller compares the pressure data received from the pressure transducer with the maximum fitting pressure. The controller continuously receives pressure data from the transducer during the fitting cycle and determines based on this data when the maximum fitting pressure has been reached.

In an alternative embodiment, controller may be configured to monitor the pressure/time data received from the pressure transducer during operation and to compare the pressure/time data to benchmark pressure/time data indicative of completed fitting assembly. As the assembly of the fitting is completed, face to face contact occurs between the collar and the inner body in the axial direction that prevents further axial movement of the collar. At this point, any further movement of the clamping jaws 32 acts to compress the fitting, rather than actuate relative movement between the fitting components. The pressure therefore increases rapidly at this point, and this rapid increase or 'spike' in pressure is indicative of completed assembly. The controller may be configured to monitor the pressure/time data and determine that assembly has been completed when the rate of increase of pressure reaches a predetermined threshold indicative of a completed assembly.

The controller is configured to automatically shut off the tube coupling tool 20 when it is determined that the maximum fitting pressure has been reached. Automatically shutting off the tube coupling tool 20 as soon as the maximum fitting pressure is detected ensures that the fitting is not over pressurised, thereby preventing damage to the coupling, incomplete or broken sealing and/or damage to the tool. System shut-off may be achieved using a relay switch to control operation of the pump. The pump may be mains or battery operated. The relay switch is electrically connected to the pump power source and to the controller. When the user initiates operation of the coupling tool 20, such as by pressing a start button on the controller's touch screen display it, a signal is sent by the controller to the relay switch to start the pump motor. The pump is then operated to hydraulically pressurise the system. When the controller identifies based on data from the pressure transducer that a target pressure indicative of complete assembly has been reached the controller sends a signal to the relay switch to cease operation of the pump motor. The system may also include a manually operated stop button, which may for example be provide on the touch screen control of the controller, that enables the user to stop the coupling tool 20 for any reason.

A fitting cycle is defined as the operation of the coupling tool 20 from activation through to complete fitting. An operational cycle is defined as the operation of the coupling tool 20 from activation through to a minimum operational pressure, which is lower than the pressure required to complete fitting. The minimum operational pressure is the pressure at which material wear to the coupling tool 20 is considered to initiate, and the operational cycles may therefore be used to monitor the service intervals of the coupling tool 20.

The controller may be configured to monitor the fitting cycle of the coupling tool 20, and compare the pressure/time data to the bench mark data to determine at any given time at what stage during the fitting cycle at which the coupling tool is operating. If the coupling tool 20 is stopped by the user before the fitting cycle is complete, the fitting cycle may be recommenced and completed when restarted by the user such as by pressing a start button.

The system may be configured such that when the pump is stopped fluid returns to the hydraulic reservoir and the system pressure is instantly relieved, which removes the compressive force from the coupling 1. Once the system pressure lowers to a value below the compressive return force of the compression spring the compression spring moves the moving jaw 32 to return it to the fully open position. Alternatively, the system may be configured such when the pump is stopped no additional pressure is generated but the fluid does not return to tank. This may be achieved using a one way valve. Instead the existing system pressure is maintained, holding the jaws 32 in position, until a valve is operated to relieve system pressure. The valve may be manually operated by the user, such as by physically operating a valve control on the or by an operating a switch or other control to cause the controller to operate the valve. Again, once the system pressure is relieved the compression spring moves the moving jaw 32 to return it to the fully open position.

The controller may be configured to compare the pressure/time data received during operation to benchmark pressure/time data or threshold pressure data indicative of a complete fitting cycle for the fitting configuration and/or a complete operational cycle for the coupling tool 20. Based on this comparison the controller can determine when a full fitting cycle has been completed and/or whether the fitting cycle has been completed successfully and in accordance with predetermined parameters. The controller is also able to determine whether an operational cycle has been completed independently of monitoring the fitting cycle.

For example, when the pressure measured by the pressure transducer reaches a predetermined threshold pressure deemed the minimum threshold for what constitutes an operational cycle, the controller is triggered to add a count to a cycle register. Similarly, when a pressure, or rate of change of pressure indicative of the completion of a fitting cycle is determined, an operational cycle may be logged by the controller. These cycle counts may be displayed in real time on the controller screen. In this way, in addition to stopping the coupling tool 20 when the maximum pressure is achieved to prevent overpressure damage, the controller may also verify that the fitting operation is properly completed across the whole cycle, and that it corresponds to an expected pressure/time profile. The controller is also configured to log data relating to the number of fitting cycles and/or operational cycles completed by the coupling tool 20. The fitting cycle data and operational cycle data may be stored locally, for example on a hard drive stored within a protective casing within the tool housing. Alternatively, the operational data may be stored on an external storage device connected to the tool 20 wirelessly or otherwise or may be transmitted to a network and stored for example in the cloud. The fitting cycle data may be downloaded or otherwise provided to a computer programme configured to display the data in the form of a pressure/time plot and to analyse the data.

The controller and/or the computer programme may to configured to identify when routine maintenance and/or repair of the coupling tool is required. For example, the controller and/or computer programme may be configured to identify when the number of operational cycles completed reaches a threshold at which maintenance is required. In addition, or alternatively the computer programme or controller may be configured to identify anomalies or trends in the operational data indicative of a fault requiring the repair of replacement of components. The computer programme and/or controller may be provided with information relating to the operational lifecycle of the coupling tool 20, including overall lifecycle and a safety factor lifecycle, as well as fitting cycle period relating to predetermined service intervals. When predetermined operational lifecycle milestones are reached, the user may be altered for example by a pop-up message or other indicator appearing on the controller. The controller may be configured to lock the system and prevent further operation of the coupling tool 20 when said predetermined milestones are reached. The coupling tool may be locked indefinitely if the tool 20 has reached the end of its lifecycle, the system will then be locked out either indefinitely if the tool has reached the end of it's life, or until the controller has been reset by the service engineer.

The controller may also be configured to receive identifier data for each individual fitting, such as the series number of the coupling. In the event of the failure of a coupling, the data logged during fitting of the coupling may be analysed to confirm that the coupling was properly assembled. This provides full traceability for each coupling, allowing identification of the tool on which the coupling was assembled, and the pressure/time data logged during the fitting cycle of that fitting.

The controller may be configured to identify pressure 'spikes' during the operation of the coupling tool 20. Pressure spikes are typically indication of a problem in the system. A pressure spike could be caused by a failure within the pump/drive system, which may cause the pump motor to run 'unlimited' in terms of motor speed or pressure limit, which may for example be a result of a failure of the pump's integral pressure relief valve. Pressure spikes may also occur if an operator error has occurred whereby incorrect fittings and/or inserts have been selected, resulting in the tool reaching the end of its travel and encountering a hard stop before the fitting has been completely assembled. For each fitting configuration the controller is provided with a threshold pressure/time value, i.e. the rate of increase of pressure, indicative of a pressure spike. The controller is configured to monitor the pressure/time data of the system and determine when the threshold value has been reached or exceeded. The threshold value may be a minimum value for increase in pressure/time, for 2,000 psi per second. If the controller identifies a pressure/time value greater than the if the system recognised a rate of pressurisation greater than the threshold value, the controller may stop or slow the pump. An indication is provided to the user, such as a warning message on the controller display, communicating to the user the reason for the shut down. If the pressure spike is indicative of a failure of the coupling tool 20, the tool 20 maybe removed from service for investigation; repair and/or service.

The coupling tool 20 therefore has the ability to monitor pressure over a fitting cycle, compare the pressure data to expected/benchmarked pressure traces, and deliver a function dependent on that comparison. The coupling tool can also automatically shut off the tool when a compression/fitting cycle has been completed to ensure that the fitting is not over pressurised and/or prevent damage to the tool. This has the added benefit of allowing the fitting data to be logged for traceability, so that it can be later verified that the fitting was installed correctly in the event of failure. It is also possible to use of the pressure trace to recognise completion of a cycle, and to log the cycle count for use in maintenance monitoring. The system also enables pressure spikes to be identified and the system to be automatically shut down in the event of such a spike.

The invention claimed is:

1. A tube coupling apparatus for the fitting of compressible tube couplings, the apparatus comprising:

first and second clamping jaws movable relative to each other between an open configuration in which they are configured and arranged to receive a compressible tube coupling and one or more tube members, and a closed configuration in which the clamping jaws apply a compression force to compress the compressible tube coupling about the one or more tube members;

an actuator arranged to operate at least one of the clamping jaws to move the clamping jaws to the closed configuration;

a controller configured to control the actuator; and a sensor arranged to determine a system parameter indicative of the compression force applied to the compressible tube coupling by the clamping jaws;

wherein the first and second clamping jaws each include a channel configured to receive the one or more tube members;

wherein the first and second clamping jaws each include an inner face to engage respective tube collars such that as the first and second clamping jaws move relative to each other along the one or more tube members the respective collars move toward each other to compress the compressible tube coupling;

wherein the actuator is configured to progressively increase the compression force of the clamping jaws during a fitting operation and the controller is configured to receive sensor data from the sensor relating to the system parameter determined by the sensor and to control the actuator to ensure the compression force achieves a first predetermined threshold and prevent the compression force exceeding a second predetermined threshold based on the sensor data, the first predetermined threshold being a hydraulic pressure greater than or equal to the hydraulic pressure required to complete assembly of the tube coupling and the second predetermined threshold being a pressure not greater than the maximum fitting pressure of the coupling.

2. The tube coupling apparatus according to claim 1 wherein the actuator is a hydraulic actuator, the sensor is a pressure sensor arranged to determine the hydraulic pressure of the actuator.

3. The tube coupling apparatus according to claim 2 further comprising a pump for supplying pressurised hydraulic fluid to the actuator, wherein the controller operative to stop the pump when the second predetermined threshold is reached to prevent the hydraulic pressure of the actuator exceeding the second predetermined threshold; and wherein the clamping jaws comprise a first clamping jaw that is fixed relative to the tool body and a second clamping jaw that is movable relative to the tool body between the open and closed configurations, and the hydraulic actuator engages the second clamping jaw to move the second clamping jaw to the closed configuration.

4. The tube coupling apparatus according to claim 1 wherein the first predetermined threshold is a rate of increase of hydraulic pressure indicative of complete assembly of the compressible tube coupling.

5. The tube coupling apparatus according to claim 1 wherein the controller is operative to receive user input data relating to a tube coupling configuration to be fitted and to determine the first predetermined threshold for the tube coupling configuration based on the user input data; and the controller is operative to compare the sensor data with data relating to the predetermined threshold to determine when the first predetermined threshold is reached.

6. The tube coupling apparatus according to claim 5 wherein a range of tube coupling configurations are grouped based on their maximum fitting pressure and a predetermined threshold pressure is associated with each group, the user input data is indicative of the group to which the tube coupling configuration to be fitted is associated, and the controller determines the predetermined threshold associated with that group and hence the predetermined threshold for the tube coupling configuration based on the user input.

7. The tube coupling apparatus according to claim 1 wherein a fitting cycle of the tube coupling apparatus is completed when the first predetermined threshold is reached during fitting of the compressible tube coupling, and the controller is operative to count the number of fitting cycles.

8. The tube coupling apparatus according to claim 7 wherein the controller is operative to determine when the number of counted fitting cycles reaches one or more predetermined cycle thresholds for the tube coupling apparatus and to execute an operation when said one or more cycle thresholds is reached; and wherein the controller is operative to disable the tube coupling apparatus when one or more predetermined cycle thresholds is reached.

9. The tube coupling apparatus according to claim 8 wherein the one or more predetermined cycle thresholds for the tube coupling apparatus includes a maximum value indicative of the maximum lifecycle of the compressible tube coupling.

10. The tube coupling apparatus according to claim 8 wherein the one or more predetermined cycles thresholds for the tube coupling apparatus include a cycle threshold defining a service interval and the controller is operative to provide a user determinable indication when the service interval has been reached.

11. The tube coupling apparatus according to claim 8 comprising a visual user display and the controller is operative to generate an indication on the visual user display indicating that the one or more predetermined cycle thresholds has been reached.

12. The tube coupling apparatus according to claim 1 wherein the actuator is a hydraulic actuator, the sensor is a pressure sensor arranged to determine the hydraulic pressure of the actuator, and the controller is operative to determine the rate of increase of hydraulic pressure during operation of the tube coupling apparatus based on data received from the sensor and to stop the actuator if the rate of increase of hydraulic pressure exceeds a threshold outside the normal range of operation indicative of a pressure spike.

13. A tube coupling apparatus for the fitting of compressible tube couplings, the apparatus comprising:

first and second clamping jaws mounted on a tool body that are movable relative to each other between an open configuration in which they are configured and arranged to receive a compressible tube coupling and one or more tube members, and a closed configuration in which the clamping jaws apply a compression force to compress the compressible tube coupling about one or more tube members;

an actuator arranged to operate at least one of the clamping jaws to move the clamping jaws to the closed configuration;

a controller configured to control the actuator; and a sensor arranged to determine a system parameter indicative of the compression force applied to the compressible tube coupling by the clamping jaws;

wherein the first and second clamping jaws each include a channel configured to receive the one or more tube members;

wherein the first and second clamping jaws each include an inner face to engage respective tube collars such that as the first and second clamping jaws move relative to each other along the one or more tube members the respective collars move toward each other to compress the compressible tube coupling;

wherein the actuator is configured to progressively increase the compression force of the clamping jaws during a fitting operation and an operational cycle of the tube coupling apparatus is completed when the compression force achieves a first predetermined threshold, and the controller is configured to determine the compression force based on sensor data received from the sensor and to control the actuator to ensure the compression force achieves the first predetermined threshold and prevent the compression force exceeding a second predetermined threshold based on the sensor data, the first predetermined threshold being a hydraulic pressure greater than or equal to the hydraulic pressure required to complete assembly of the tube coupling and the second predetermined threshold being a pressure not greater than the maximum fitting pressure of the coupling, count an operational cycle each time the first predetermined threshold is reached, determine when the number of counted operational cycles reaches one or more predetermined cycle thresholds, and execute an operation when said one or more cycle thresholds is reached.

14. The tube coupling apparatus according to claim 13 wherein the controller is operative to disable the tube coupling apparatus when one or more predetermined cycle thresholds is reached.

15. The tube coupling apparatus according to claim 13 wherein the one or more predetermined cycle thresholds for the tube coupling apparatus includes a maximum value indicative of the maximum lifecycle of the tube-compressible tube coupling.

16. The tube coupling apparatus according to claim 13 wherein the one or more predetermined cycle thresholds for the compressible tube coupling apparatus defines a service interval and the controller is operative to provide a user determinable indication when the service interval has been reached.

17. The tube coupling apparatus according to claim 13 comprising a visual user display and the controller is operative to generate an indication on the visual user display indicating that the one or more predetermined cycle thresholds have been reached.

18. A tube coupling apparatus for the fitting of compressible tube couplings, the apparatus comprising:

first and second clamping jaws mounted on a tool body that are movable relative to each other between an open configuration in which they are configured and arranged to receive a compressible tube coupling and one or more tube members, and a closed configuration in which the clamping jaws apply a compression force to compress the compressible tube coupling about one or more tube members;

a hydraulic actuator arranged to move at least one of the clamping jaws to the closed configuration;

a controller configured to control the hydraulic actuator; and a pressure sensor arranged to determine the hydraulic pressure of the hydraulic actuator;

wherein the first and second clamping jaws each include a channel configured to receive the one or more tube members;

wherein the first and second clamping jaws each include an inner face to engage respective tube collars such that as the first and second clamping jaws move relative to each other along the one or more tube members the respective collars move toward each other to compress the compressible tube coupling;

wherein the hydraulic actuator is configured to progressively increase the compression force of the clamping jaws during a fitting operation and the controller is operative to determine the rate of increase of hydraulic pressure during operation of the tube coupling apparatus based on data received from the pressure sensor to ensure the compression force achieves a first predetermined threshold and to stop the actuator if the rate of increase of hydraulic pressure exceeds a second predetermined threshold, the first predetermined threshold being a hydraulic pressure greater than or equal to the hydraulic pressure required to complete assembly of the tube coupling and the second predetermined threshold being a pressure not greater than the maximum fitting pressure of the coupling.

* * * * *